March 14, 1967  R. PFLUEGER  3,308,506
PROCESS AND APPARATUS FOR THE CONTINUOUS PRODUCTION
OF PROFILES FROM THERMOPLASTICS
Filed Nov. 27, 1964  2 Sheets-Sheet 1

INVENTOR:
RICHARD PFLUEGER
BY
Marzall, Johnston, Cook & Root
ATT'YS

March 14, 1967  R. PFLUEGER  3,308,506
PROCESS AND APPARATUS FOR THE CONTINUOUS PRODUCTION
OF PROFILES FROM THERMOPLASTICS
Filed Nov. 27, 1964  2 Sheets-Sheet 2

INVENTOR:
RICHARD PFLUEGER
BY
Marzall, Johnston, Cook & Root
ATT'YS

United States Patent Office 3,308,506
Patented Mar. 14, 1967

3,308,506
PROCESS AND APPARATUS FOR THE CONTINUOUS PRODUCTION OF PROFILES FROM THERMOPLASTICS
Richard Pflueger, Ludwigshafen (Rhine), Germany, assignor to Badische Anilin- & Soda-Fabrik Aktiengesellschaft, Ludwigshafen (Rhine), Germany
Filed Nov. 27, 1964, Ser. No. 414,313
Claims priority, application Germany, Nov. 30, 1963,
B 74,475
2 Claims. (Cl. 18—12)

This invention relates to the continuous production of elongated shapes, such as rods or other sections from thermoplastics having a narrow range of fusion, for example polyamides, polyurethanes having recurring carbonamide groups in the chain, polyolefins and polyacetals.

Owining to various physical properties of the said thermoplastics having a narrow range of fusion, it has been difficult to prepare rods or other sections therefrom, particularly by a continuous process. These properties include relatively narrow melting and solidification ranges, relatively low viscosity in the molten state, their gel-like character immediately prior to solidification and high volume contraction during solidification.

Figure 1:
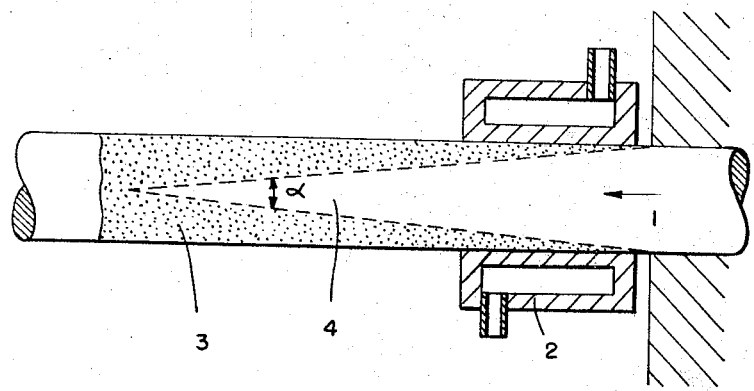

FIGURE 1 of the accompanying drawings will be referred to explain processes in which molded articles are produced by allowing melts of the said plastics to solidify continuously in a cooled molding unit. In FIGURE 1, 1 indicates the melt supplied to molding unit 2 and which solidifies in the outer zone 3. The liquid phase forms a cone 4 in the interior of the article, the angle $\alpha$ of the cone being the more obtuse the higher the rate of solidification of the melt and the slower the throughput rate (=draw-off rate) of the plastic. The production of sections from thermoplastics having a narrow range of fusion is particularly difficult in the case of molded articles which have large cross-sectional surfaces because the angle $\alpha$ of the molten cone becomes small at high draw-off speeds and even when the melt is supplied to the molding unit under high pressure it is difficult to avoid formation of bubbles and internal stresses reliably because the solidifying melt becomes highly viscous owing to gelation and therefore cannot reach coherently the top of the cone of the melt. It is therefore necessary to arrange for the draw-off rate of the shaped article formed to be such that the angle $\alpha$ of the molten cone is as large as possible. This is only possible however at low draw-off rates, i.e., low throughputs.

In a prior art method of this type, the molten plastic is continuously forced into the molding unit, and too high a frictional effect between the molding unit and the section is prevented by lubricating the unit.

Another method for the continuous production of bubble-free rods by forcing organic plastic through a cooled molding unit is known in which the necessary back pressure is produced by a tubular zone of plastic formed owing to the cooling and forced against the wall of the molding unit by the pressure used. When using polyamides, the magnitude of the back pressure of the surface of the tubular zone formed in the molding unit, which surface is in frictional engagement with the wall of the molding unit, is affected by variation in the cooling and/or molding pressure used.

According to another known method, rods or other sections of thermoplastic materials are manufactured continuously in an extruder by carefully regulating the pressure and temperature of the melt and by using a connection between the pipe for supplying the melt and the molding unit which consists of a material of low thermal conductivity.

Sections having large cross-sectional surfaces can only be prepared at relatively low draw-off rates when using the said methods.

It is an object of this invention to provide a continuous process for the manufacture of rods or other sections from thermoplastic materials which rods or sections have high strength and good surface characteristics. Another object of the invention is the production of rods or other sections from thermoplastic materials which are free from bubbles. A further object of the invention is the production of rods or other sections from thermoplastic materials which are free from gels. A still further object of the invention is the production of rods or other sections from thermoplastic materials which are free from internal stresses. Other objects will become apparent from the detailed description of the invention.

In accordance with this invention these objects are achieved by arranging a displacement member in the molten cone formed in the interior of the externally solidified profile in such a way that a thin layer of liquid melt is present at the surface of the displacement member.

The apparatus for the continuous manufacture of rods or other sections according to this invention incorporates a wedge-shaped or cone-shaped displacement member which is rigidly and concentrically arranged after the conveying means in the direction of flow with its apex in the direction of flow and which projects into or through the molding unit.

A particularly advantageous property of the rods or other sections prepared according to this invention is that they are free from bubbles. Owing to the provision in the molten cone of the displacement member, which usually is neither cooled nor heated, and owing to strong external cooling, both the residence period during which the thermoplastic is in the molten state and the solidification period are reduced and gel formation is substantially prevented. The rods or other sections can therefore be prepared at a high speed without the formation of bubbles or appreciable internal stresses. Molecular degradation of thermally sensitive substances is less than in the prior art processes. The rods or other sections, even those having large cross-sectional surfaces, are homogeneous and in the case of crystallizing thermoplastics have a finely crystalline structure.

Polyamides or polyurethanes having recurring carbonamide groups in the chain which are suitable for the production of rods or other sections according to this invention may be prepared by conventional methods, if desired in the presence of neutral or acid catalysts, from:

(1) Lactams having four to twelve ring carbon atoms, such pyrrolidone, piperidone, caprolactam, oenanthic lactam, capryllactam or laurolactam, (2) Salts of diamines, such as hexamethylene diamine, octamethylene diamine, decamethylene diamine, bis-(4-aminocyclohexyl)-methane, dodecamethylene diamine, m-xylylene diamine, 2,5-diaminotoluene, 1,4-diaminomethylcyclohexane, and dicarboxylic acids, such as adipic acid, suberic acid, azelaic acid, sebacic acid, undecanedicarboxylic acid, decanedicarboxylic acid and heptadecanedicarboxylic acid, (3) Diisocyanates, such as hexamethylene diisocyanate or toluylene diisocyanate, and diols, such as butanediol, hexanediol, and octanediol, and also mixtures of the compounds given under (1) and (2).

Suitable polyolefins are polyethylene having a density of 0.91 to 0.96, isotactic polypropylene, copolymers of ethylene and other olefins, which may be prepared by conventional methods.

Suitable polyacetals are particularly acetylated polyformaldehyde and copolymers of formaldehyde or trioxane with alkylene oxides.

The means for supplying the molten thermoplastic may for example be an extruder capable of being heated and cooled by means of which the plastic can be fused and forced into the cooled molding unit under pressure. Melting units in which the melt is conveyed into the cooled molding unit by means of gear or piston pumps are also suitable.

For the production of rods or other sections by means of a casting method which directs the melt into the molding unit without pressure, the plastic is melted in a suitable container whose outlet opening is located higher than the opening of the cooled molding unit and allowed to flow into the molding unit. By "casting" there is to be understood the production of rods or other sections by means of a vertical molding unit, the rod or other sections being drawn off by suitable means.

Examples of molding units capable of being cooled which may be used for the production of rods or other sections or rods are those known to be suitable for extrusion or casting of thermoplastics, for example open-ended molds with or without vacuum calibration, for example, by means of small holes arranged around the circumference of the open-ended mold and to which a vacuum is applied.

The shape and length of the cone-shaped or wedge-shaped displacement member should be adapted to the molten cone. In all cases a displacement member is used which tapers inwardly in the direction in which the material flows. The displacement member may project up to the apex of the molten cone or wedge, or may project only part of this distance. In the manufacture of rods it may be detachably secured to the end of the mandrel in the extruder head. The angle $\alpha$ of the displacement member is 5 to 30°, preferably 10 to 15°. Its length depends above all on the thickness of the section and on the solidification period of the cone of the thermoplastic profile.

When the molding unit capable of being cooled is attached to an extruder, a thermally insulating disc, for example of asbestos or a heat-resistant polyfluorocarbon may be used to prevent transfer of heat between the molding unit and the extruder head. From the cooled molding unit to the heated extruder head the forces may be transferred via a knife edge and it is also possible to decrease, within permissible limits, the cross-section at the point between the molding unit and the extruder head, where the heat is removed.

Conventional means, for example pairs of rollers, caterpillars or belts, are suitable for withdrawing the rod or other section formed. All parts of the apparatus with the exception of the thermally insulating disc are made of metal.

Figure 2:
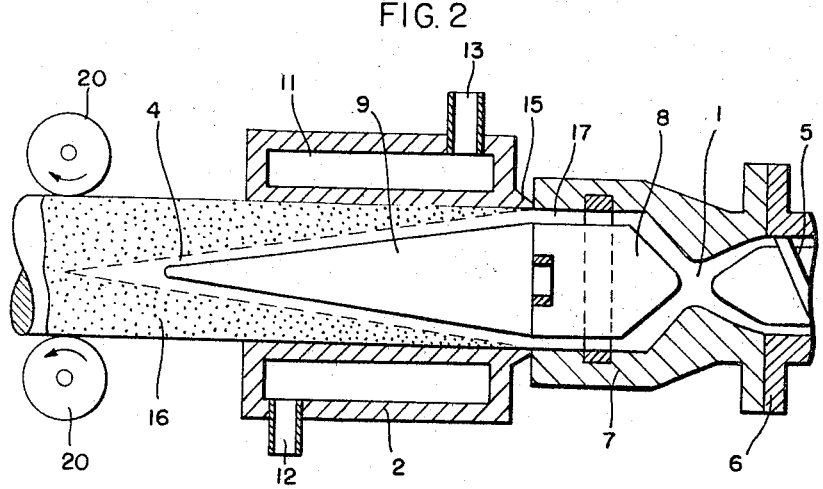
Figure 3:
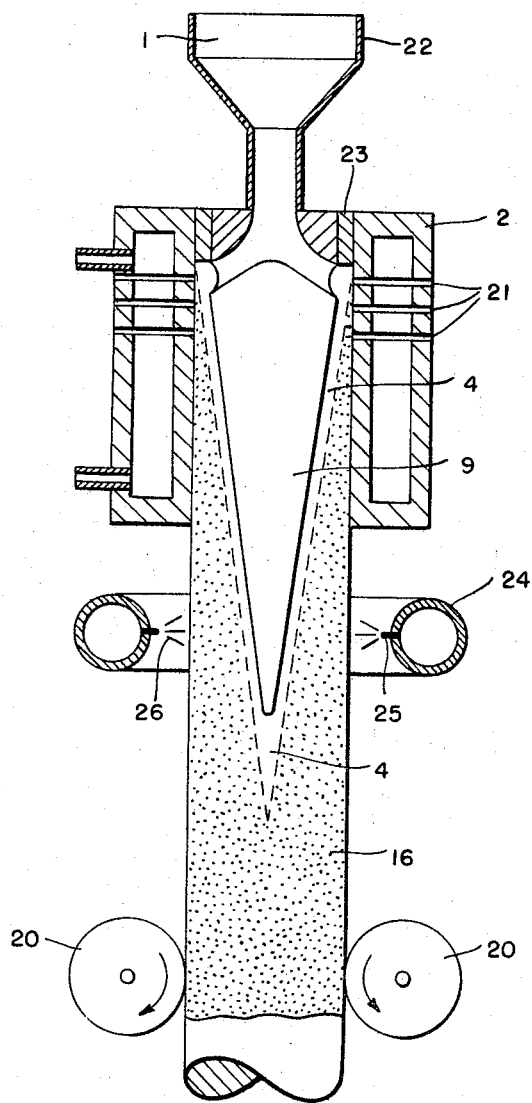

The invention is further illustrated by FIGURES 1 to 3 of the accompanying drawings in which FIGURE 1 shows a cooled molding unit of the conventional type, FIGURE 2 depicts horizontally arranged apparatus for carrying out the process according to this invention and FIGURE 3 shows the same apparatus in a vertical position.

The invention will now be explained in greater detail with reference to FIGURE 2 of the accompanying drawings which shows an apparatus according to the invention which incorporates a rigidly mounted, concentrically arranged conical displacement member. To the extruder 5, which is capable of being heated and cooled, a barrel head 6 is attached and to this an extruder head 7 with a mandrel 8 is detachably secured. Such an arrangement is usually employed for the extrusion of thin pipe or tubing. A cone-shaped displacement member 9 is detachably secured to mandrel 8.

After the extruder head 7 in the direction of flow, a water-cooled molding unit 2 is arranged having an inner space 11, a supply pipe 12 and an outlet pipe 13. The molding unit 2 consists of a cylindrical tube which is attached to extruder head 7. Heat transfer between the cylinder head and the molding unit 2 is kept at a minimum by a circular knife edge 15 or a similar device, for example an insulating disc.

In the manufacture of the section 16, the melt 1 is forced from extruder 5 into the annular channel 17 between extruder head 7 and mandrel 8 and then into the space defined by displacement member 9 and the water-cooled molding unit 2 in which melt 1 forms a molten cone 4.

FIGURE 3 shows apparatus for carrying out the process according to the invention which is suitable for casting in a vertically positioned unit at atmospheric pressure.

Molding unit 2, which is cooled by means of a liquid coolant and which is advantageously provided with bores for the generation of subatmospheric pressure, is filled with low-vicosity melt 1. The solidified profile 16 is drawn off by means of a pair of rollers 20 at a rate corresponding to the rate of solidification. The cone-shaped displacement member 9 projects into the molten cone 4 and is secured to molding unit 2 from which it is thermally insulated, for example by means of a ring 23 consisting of an asbestos cement composition or a polymer derived from an ethylenically unsaturated fluorohydrocarbon. 24 is an additional means for cooling the externally solidified profile. It may consist of an annular pipe having bores 25 on the inner side from which cooling water 26 flows.

For the production of section by means of a preferred embodiment of apparatus according to this invention (FIGURE 2), the pressure and conveyance of the melt are regulated by correlating the molecular weight of the plastic being processed, the length and depth of the pumping zone of the screw and the rotary speed of the screw. Manometric pressure control and/or a pressure reduction valve are not necessary. Consequently expenditure for apparatus for carrying out the process according to this invention is low. It is advantageous to regulate the temperatures in the heating zones of the extruder barrel to about $\pm 2°$ C. The profile is conducted by the pair of rollers 20 at the predetermined speed which depends on the thickness of the section and the type of plastic used. The size of the extruder and the screw speed are chosen so that the melt is forced into the molding unit under pressure and the externally solidified section is forced from the molding unit.

EXAMPLES

The following Examples 1 and 2 describe the working conditions used in the method according to this invention for the manufacture of rods of 6-polyamide and polyformaldehyde.

*Example 1*

A rod 60 mm. in diameter is continuously manufactured from 6-polamide having a relative viscosity $\eta_{rel.}$ of 4.0 (measured in 96% $H_2SO_4$; c.=1 g./ 100 ml. of solution) using a screw extruder with a shaft 45 mm. in diameter (D) and 15D in length. The molding unit, which consists of an open-ended mold provided with a cooling jacket, is 300 mm. long and firmly secured to the extruder head. The displacement member secured to the mandrel is a concentrically arranged steel cone of 350 mm. length and 50 mm. maximum diameter. The rod can be drawn off at a rate of 1.2 m./h. If the displacement member is omitted, the maximum draw-off rate is 1.2 m./h. The rod prepared using the displacement member is free from bubbles and substantially free from stresses. Moreover, it has a finely crystalline structure with a spherolite size of less than $10\mu$.

*Example 2*

A rod 100 mm. in diameter is continuously manufactured from acetylated and conventionally stabilized polyformaldehyde ($\eta_{rel.}$=1.4; measured in a 3.2 phenol/ o-dichlorbenzene mixture at 100 C.; c=0.25 g./100 ml.) using the extruder described in Example 1. The cooled open-ended mold secured to the extruder head is 300 mm. long. The displacement member attached to the mandrel is 400 mm. long and has a maximum diameter of 85 mm. The rod can be drawn off at a rate of 0.5 m./h. If the displacement member is omitted, the maximum draw-off rate is 0.4 m./h. The rod prepared using the displacement member is free from bubbles and substantially free from stresses.

I claim:

1. Apparatus for making rods or other sections from molten thermoplastics which comprises: a molding unit, means for passing molten thermoplastic material into said unit; cooling means surrounding said unit for solidifying said material; means for maintaining a molten cone of said material within said unit, said means including a tapering displacement member, said displacement member being rigidly and concentrically arranged with its apex in the direction of flow of said material and projecting into said molding unit; and means for withdrawing said material in a solidified form from said molding unit.

2. Apparatus as in claim 1 wherein said displacement member is conical in shape and wherein said displacement member extends beyond the cooled section of said molding unit.

References Cited by the Examiner

UNITED STATES PATENTS

| | | | |
|---|---|---|---|
| 2,461,630 | 2/1949 | Cozzo | 18—14 |
| 2,629,898 | 3/1953 | Orsini | 18—14 X |
| 2,810,159 | 10/1957 | Teichmann | 18—14 X |
| 3,018,516 | 1/1962 | Clinefelter | 18-14 |
| 3,026,564 | 3/1962 | Kohlwey | 18—14 X |
| 3,079,634 | 3/1963 | Berger | 18—14 X |
| 3,150,217 | 9/1964 | Shanok et al. | 264—176 |
| 3,169,589 | 2/1965 | Bodine. | |
| 3,170,972 | 2/1965 | Knipp et al. | 264—176 |

FOREIGN PATENTS

| | | |
|---|---|---|
| 143,376 | 1/1950 | Australia. |

WILLIAM J. STEPHENSON, *Primary Examiner.*